June 18, 1929.  W. T. ANDERSON, JR., ET AL  1,717,360
APPARATUS FOR POLARIZING ULTRA VIOLET RADIATIONS
Filed May 1, 1926
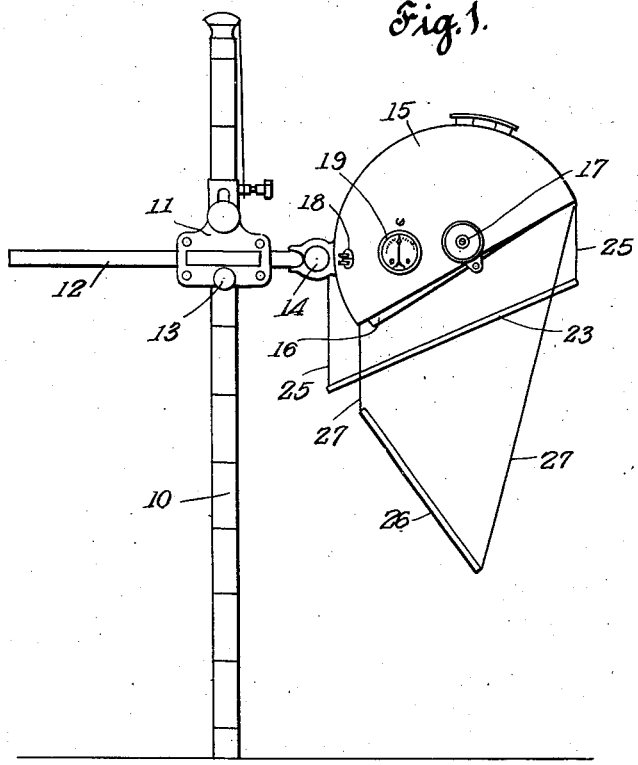
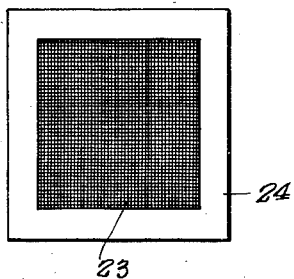
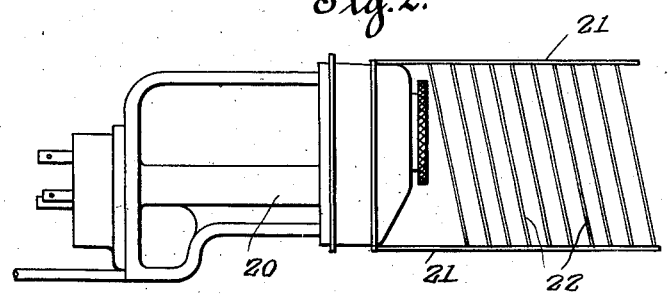
INVENTORS
William S. Anderson, Jr.
Frederic W. Robinson
BY
Fredk C. Fischer
ATTORNEY Patented June 18, 1929.

1,717,360

UNITED STATES PATENT OFFICE.

WILLIAM T. ANDERSON, JR., AND FREDERIC W. ROBINSON, OF NEWARK, NEW JERSEY, ASSIGNORS TO HANOVIA CHEMICAL AND MFG. CO., OF NEWARK, NEW JERSEY, A CORPORATION OF NEW JERSEY.

APPARATUS FOR POLARIZING ULTRA-VIOLET RADIATIONS.

Application filed May 1, 1926. Serial No. 105,909.

This invention relates to the application of well known physical laws for the production of polarized ultra-violet radiations for therapeutic purposes.

It has been demonstrated repeatedly that polarized visible light has a more marked chemical, biological and physiological action than ordinary heterogeneous visible light, the results in some instances resembling such as are obtained ordinarily by ultra-violet light alone.

Therefore the reactivity of ordinary therapeutic ultra-violet radiation may be considerably enhanced by a complete or even partial polarization of the ultra-violet rays.

Furthermore, there is a possibility of obtaining a selective reactivity with polarized ultra-violet light not obtainable with heterogeneous radiations, the results of this feature being that the scope of ultra-violet therapy may be considerably extended and the the promotion of undesirable side reactions mitigated or very completely avoided.

There are at present on the market no equipment for polarizing ultra violet light. Even the classical Nicol's prism does not serve for the ultra violet because the layer of balsam cement absorbs these rays. The two most practical methods for polarizing ultra violet light are by reflection at the polarizing angle from a transparent substance, preferably transparent to these rays, and by refraction at the polarizing angle thru a substance which is transparent to ultra violet.

The purpose of the present invention is to provide a device for polarizing ultra-violet light radiations by a novel combination of quartz mercury vapor arc lamps in connection with mirrors, reflection gratings, refraction screens or combinations of these elements, together with other advantages as hereinafter described and graphically indicated in the associated drawing, in which:—

Figure 1 is a diagrammatic side view of a convention type of lamp, together with its stand, suspended grating and mirror.

Figure 2 is a similar but enlarged view of a lamp head and refraction screen.

Figure 3 is a plan view of a screen in detail.

In the drawing the numeral 10 designates an upright cylindrical support, minus its base and having a frame 11 slidably and rotatably mounted thereon, the frame being counter weighted as indicated.

A horizontal bar 12 is slidable in the frame 11, the same being provided with means for lengthwise movement actuated by a hand knob 13, and at one end of the bar is a pivotal connection 14 for a hollow hemispherical guard casing 15 containing a lamp holder 16 pivoted in the casing at 17.

On the casing are connections 18 for electrical currents and calibrating means 19 for the same. A lamp 20, shown in Figure 2 is carried in the holder 16 or manually held in conformity with the purpose to which it is applied, all these several parts being shown as explanatory of the methods and devices for attaining the present purposes.

A frame 21 is shown in Fig. 2 as attached to the front of the lamp 20 and carried by the frame are a series of refraction screens 22, inclined at a definite manner to the axis of the lamp so as to obtain the proper angle for the maximum polarization at the desired wave length.

These refraction screens 22 are made of material transparent to ultra-violet light rays, such for instance as crystal quartz, fused quartz, cellulose, gelatine or other suitable substances which minimize or prevent the passage of other light.

In Figure 3 is illustrated a screen 23 enclosed in a frame 24 and shown suspended in Figure 1 by cords 25 or like supports in front of the lamp casing 16, preferably between the quartz mercury arc lamp and subject undergoing treatment.

These reflection screens or gratings 23 are made of metals or alloys, the choice of which depends on the quantity and characteristics of the desired polarized ultra-violet light, and permit a wide range in their structure.

The reflection gratings may be composed of cross strips extending in one or a plurality of directions and of varying cross sections, such as smooth and round, like wires, flat, like tapes or of jagged irregular formation, plated, sputtered or otherwise finished and may be used in various combinations in the same instrument.

The mirrors 26, are adjustably supported by cords 27; these mirrors may be constructed of fused or crystal quartz, either plain or covered with a layer of metal, of graphite plated with metal, or of solid metals or alloys, selection of which is dependent on the characteristics of the polarized ultra-violet light to be obtained, as stated with reference to the grating.

The relation and position of the mirrors and screens with respect to each other and to the lamp is empirical and subject to experimental development; however, the known results are the attainment of a high degree of efficiency in the production of polarized ultra-violet radiation for therapeutical purposes hitherto not accomplished by lamps of a similar character.

The beam of ultra violet light to be polarized is projected upon a transparent material such as fused quartz, crystal quartz, Vita-glass, Vioray, Corex or Helioglass arranged so that the light falls at the polarizing angle. About 15 to 20% of the light is reflected, the remaining 85 to 80% being refracted and transmitted. The refracted light is largely polarized, the degree of polarization depending on the accuracy with which the incident light strikes the plate at the polarizing angle. The transmitted light is projected upon another plate also arranged so that the light strikes at the polarizing angle. The already polarized light is not reflected, being transmitted thru the plate without change or loss. The non-polarized light is reflected to the usual extent but since the total amount of incident non-polarized light is much smaller than that on the first plate the amount reflected is insignificant. Consequently, the greater part of the light incident on the second plate goes thru the plate, the emitting light being more nearly 100% polarized. This process can be repeated until finally 100% polarization results. The employment of additional plates, provided of course that they do not absorb the rays will not in any way affect the intensity of the transmitted light. It is understood of course, that substances highly transparent to ultra-violet must be employed, for polarized light can be absorbed.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:—

1. An apparatus for producing ultra violet rays for therapeutic purposes, comprising a mercury vapor arc lamp for generating ultra violet rays, a plurality of refraction gratings mounted on said lamp in the path of the ultra violet rays emitted therefrom to polarize the ultra violet rays, and a mirror adjustably hung by cords from the lamp to further polarize ultra violet rays which have passed through the grating to thus increase the polarizing efficiency of the apparatus.

2. An apparatus for polarizing ultra violet rays for therapeutic purposes, comprising a mercury vapor arc lamp generating ultra violet rays, a plurality of refraction gratings mounted on said lamp to polarize ultra violet rays emitted therefrom, and a mirror adjustably supported by the lamp and positioned beyond the refraction grating to further polarize the rays after they have passed through the gratings.

This specification signed and witnessed this 16th day of April, 1926.

WILLIAM T. ANDERSON, Jr.
FREDERIC W. ROBINSON.